Figure 1:
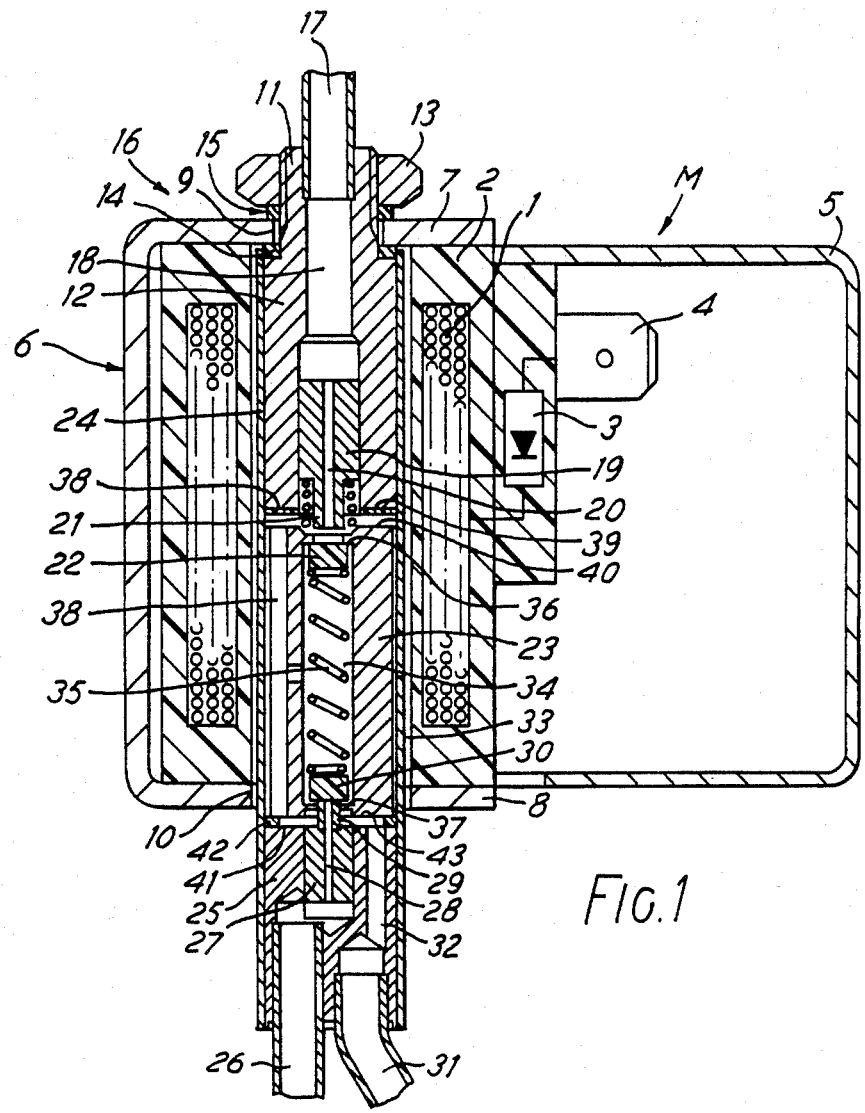

United States Patent [19]

Johansen et al.

[11] Patent Number: 4,523,739
[45] Date of Patent: Jun. 18, 1985

[54] MAGNETIC VALVE FOR REFRIGERATION PLANT

[75] Inventors: Claus J. Johansen; Jens K. Jark, both of Sønderborg; Thorvardur S. Stefansson, Nordborg, all of Denmark

[73] Assignee: Danfoss A/S, Nordborg, Denmark

[21] Appl. No.: 598,716

[22] Filed: Apr. 11, 1984

[30] Foreign Application Priority Data

Apr. 22, 1983 [DE] Fed. Rep. of Germany ....... 3314722

[51] Int. Cl.$^3$ .............. F16K 31/02; F17D 00/00
[52] U.S. Cl. .................. 251/139; 251/368; 137/625.65
[58] Field of Search .............. 251/139, 368; 137/625.65, 625.27, 375; 335/247, 248, 249

[56] References Cited

U.S. PATENT DOCUMENTS

| 2,484,483 | 10/1949 | Berry | 251/368 |
| 3,670,768 | 6/1972 | Griswold | 251/368 |
| 3,707,992 | 6/1973 | Ellison | 137/625.65 |
| 4,159,026 | 6/1979 | Williamson | 137/625.65 |

FOREIGN PATENT DOCUMENTS

| 2739699 | 9/1977 | Fed. Rep. of Germany | 137/625.65 |
| 2757803 | 7/1978 | Fed. Rep. of Germany | 137/625.65 |
| 1118462 | 10/1976 | United Kingdom | 137/625.65 |

Primary Examiner—Francis K. Zugel
Assistant Examiner—Gerald Anderson
Attorney, Agent, or Firm—Wayne B. Easton

[57] ABSTRACT

The invention relates to a magnetic valve for a refrigeration plant. The valve is of the type having a magnetic coil with a plug member of magnetic material projecting into a central bore thereof. The yoke has parallel limbs. A housing block member is mounted in fixed relation to the coil and in spaced relation to the plug member to provide an armature space. A plunger type armature is disposed in the armature space where its stroke is limited at both ends thereof. The armature has a first end face magnetically pulled against the plug when the coil is energized and a return spring opposing the energizing force of the coil. The armature has a second end face at the other end thereof which is pushed into engagement with said housing block member by the return spring when the coil is deenergized. Layers of refrigerant-proof plastics such as polytetrafluoroethylene form one or both of the end faces of the engaging end faces between the plug member and the armature and between the armature and the housing block member. A resilient connection is provided between the plug member and the yoke to provide for cushioned relative movement therebetween.

9 Claims, 2 Drawing Figures

U.S. Patent   Jun. 18, 1985   4,523,739

MAGNETIC VALVE FOR REFRIGERATION PLANT

The invention relates to a magnetic valve for refrigeration plant, comprising a plug of magnetic material projecting into the magnet coil and connected to a yoke, and a plunger-type armature which has a stroke limited at both ends, carries a closing member at least at one end for co-operating with a valve seat, has one end face magnetically pulled against the end of the plug when the coil is energised and, on de-energisation, is moved by a return force with its other end against an abutment face with the interpositioning of an element of refrigerant-proof plastics such as polytetrafluoroethylene.

In a known magnetic valve of this kind (DANFOSS Valve EVJ), the plug is held by a screw to the end face of a cup-shaped metal housing which, together with a base plate of this housing, forms the yoke. The plug is connected to the valve housing by way of an armature tube. The stroke of the plunger-type armature which is biassed by a return spring is limited in one direction by abutment of the armature against the plug of the magnet and in the other direction by abutment against the valve seat of the closing member which is fixed to the armature. This valve has a life of about 1 million switching operations. The noise of switching is low but can nevertheless prove annoying when incorporated in some refrigeration furniture which is prone to resonate.

It is also already known for magnetic valves (DE-AS No. 11 69 242) to dispose a plug or plate of elastic material between the one end face of the armature and the associated face of the remainder of the magnetic system so as to bring about noise damping.

Further, it is known in a magnetically actuated three-way valve in which the magnetically conductive plug carries a valve seat (DE-AS No. 11 50 252) to provide the closing member in the plunger-type armature of resilient material and to secure the plug to the yoke with the interpositioning of an elastic ring so as to dampen the noise.

The invention is based on the problem of providing a magnetic valve for refrigeration plant of the aforementioned kind giving a still longer life and resulting in less noise.

This problem is solved according to the invention in that a layer of refrigerant-proof plastics separate from the closing member is provided between the end face of the plug and the one end face of the armature and that the plug is secured to the yoke with an interposed elastic intermediate layer.

In this construction, impact of the armature on the magnetically conductive plug is damped by the layer of refrigerant-proof material. For magnetic reasons, this layer must only be thin. Since known refrigerant-proof materials such as polytetrafluoroethylene are not particularly elastic, the buffer effect of this layer is limited. It practically prevents only the creation of metallic noise of impact. The impact energy is for the most part transmitted to the plug. Since the latter is elastically supported, any remaining noises are transmitted to the yoke and thus to the piece of refrigeration furniture to only a strongly reduced extent, vibrations which affect the life being substantially eliminated. Between the plug and yoke one can use elastic materials which need no longer be refrigerant-proof, thereby facilitating a suitable choice. The plastics layer may be thin in comparison with elastic intermediate layers. A thickness of 1 mm and less will suffice. The independence from a closing member that may be provided at this end face of the armature ensures that, even in the case of wear of the closing member which is inevitable in the course of a long life, there will be no danger of the armature making metallic impact with the plug, even if the gap to be bridged by the magnetic flux has been selected at the outset to be so small as is made possible by the plastics layer here used. Independence from the closing member has the additional advantage that not only the small valve seat surface but also considerably larger areas are available for receiving the force so that the layer will be subjected to comparatively small surface pressures upon impact.

It is also favourable for the plastics element to be a layer which is independent from the closing member and disposed between the other end face of the armature and the abutment face. A comparatively large area will then also be available here for the element preventing the metallic impact.

Advantageously, the abutment face is connected to the yoke only in so far that it is held by the plug by way of an armature tube, the elastic intermediate layer being compressible in both directions of movement of the armature. In this way, the elastic intermediate layer is effective not only when the armature strikes the plug but also when it strikes the abutment face. In both cases, noise is damped considerably and reflection of the sound from the magnet attachment is prevented.

In particular, the elastic intermediate layer may consist of two elastic rings disposed on both sides of a web of the yoke through which the plug passes. This is a very simple form of making the elastic intermediate layer effective at both sides.

The plastics layers could also be formed by inserted discs or rings. Another possibility is that the plastics layers are formed by a coating applied to the end face of the plug, the abutment face or the end faces of the plunger-type armature.

Desirably, the first layer is subjected to the armature over a larger area than is the second layer. This takes account of the fact that the impact under the influence of the magnetic force is generally stronger than the impact under the influence of the return force.

Desirably, the at least one closing member is held for axial movement in the armature and is pressed by a spring against a counterbearing in the armature. By means of this construction, which is known per se, it is possible to make the plastics layer independent of the closing member.

In a valve fed with A.C., it is also advantageous to install a rectifier in series with the magnet coil, energisation by way of pulsating direct current still further reduces the noise level of the valve.

It is also favourable if connecting conduits connected to the plug or to the abutment face are each provided with at least one loop for taking up axial movements. In this way one can effectively prevent annoying noises from being radiated through the connecting conduits, for example capillary tubes.

The same purpose is served if the connecting conduits are each provided with elastic securing means. Preferably, these securing means are provided beyond at least one loop.

Figure 2:
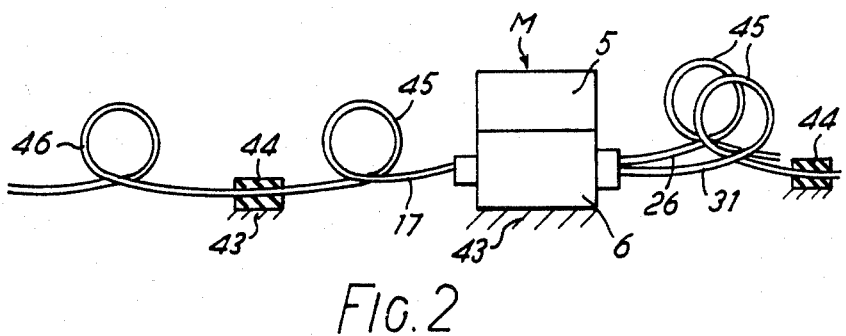

A preferred example of the invention will now be described in more detail with reference to the drawing, wherein:

FIG. 1 is a longitudinal section through a three-way valve for refrigeration plant, and FIG. 2 is a diagrammatic representation of a built-in magnetic valve.

According to FIG. 1, in a magnetic valve M, a cylindrical exciter coil 1 embedded in a plastics insulation 2 is in series with a rectifier 3. Alternating current leads may be connected to terminals 4 in a junction box 5. The exciter coil 1 is enclosed by a U-shaped yoke 6 having two parallel limbs 7 and 8 each with an aperture 9 and 10, respectively.

The screw-threaded section 11 of a plug 12 magnetically conductive material passes through the aperture 9 and is provided on the outside with a securing nut 13. An elastic ring 14 is placed between a shoulder of the plug 12 and the limb 7 of the yoke and a second elastic ring 15 is placed between the nut 13 and the other side of the limb 7. The two elastic rings 14 and 15 form an elastic intermediate layer 16.

The plug 12 is provided with a connecting conduit 17 which communicates with a valve seat 21 by way of a central bore 18 and an insert 19 having a bore 20. The valve seat co-operates with a closing member 22 of polytetrafluoroethylene in a plunger-type armature 23.

The plug carries a refrigerant-proof armature tube 24 which is soldered or welded thereto, passed through the aperture 10 of the web 8 of the yoke with play and carries a housing block 25 at the other end. The block comprises a connecting conduit 26 which communicates with a valve seat 29 by way of an insert 27 having a bore 28. The valve seat co-operates with a closing member 30 of polytetrafluoroethylene in the armature 23. A second connecting conduit 31 leads by way of a bore 32 into the interior 33 which is enclosed by the armature tube 24 and receives the armature 23.

The two closing members 22 and 30 are disposed in a bore 34 of the armature and are subjected to a spring 35 which presses the closing members apart. The closing member 22 will lie against either a counterbearing 36 or the valve seat 21. On the other hand, the closing member 30 will come to lie either against a counterbearing 37 or the valve seat 29. Axial passages 38 in the armature permit communication between the two sides of the armature so that refrigerant supplied by way of the connecting conduit 31 depending on the excitation of the magnetic valve can be led off either by way of the connecting conduit 17 or by way of the connecting conduit 26. Similarly, it is also possible to feed the connecting conduit 31 selectively from the connecting conduit 17 or from the connecting conduit 26.

The entire end face 38 of plug 12 is provided with a layer 39 in the form of a thin coating of polytetrafluoroethylene against which the corresponding end face 40 of the armature will come to lie. An abutment face 41 is formed by the end face of the housing block 25. At this position, a layer 42 is provided in the form of a thin ring of polytetrafluoroethylene against which the end face 43 of the armature can abut. Abutment against the plastics layer 39 is larger than the abutment against the plastics layer 42. The thickness of the layers 39 and 42 can be less than 1 mm, for example 0.2 mm.

In FIG. 2, the magnetic valve M is secured to a fixed part 43 of the refrigeration plant. The connecting conduit 17 is likewise held to the fixed part 43 by means of an elastic securing device 44, for example a rubber block. The connecting conduit 17 comprises a first loop 45 between the securing device 44 and magnetic valve M as well as a second loop 46 beyond the securing device. Similarly, the connecting conduits 26 and 31 possess a securing device 44 as well as loops 45. The loops 45 take up axial movements of the connecting conduits and therefore prevent the transmission of noises to the refrigeration plant, as does the elastic securing device 44.

This construction results in a long life because there is no metallic contact between the armature and other parts and impacts on the plug are transmitted to the rest of the magnetic system after elastic damping. In addition, noises during switching on and off are strongly damped because metallic impact sounds are completely omitted and the impacts exerted on the plug 12 cannot be transmitted to the rest of the magnetic system. This system is all that is connected to the item of refrigeration furniture. Consequently, the furniture cannot radiate the noises as a resonating body.

Of course it is also possible to omit the valve seat 21 or 29 to result in a two-way valve.

We claim:

1. A magnetic valve for a refrigerator plant, comprising, a magnetic coil unit having a central bore, a plug member of magnetic material projecting into said bore, a yoke, resilient means connecting said plug member to said yoke to provide for cushioned relative movement therebetween, a housing block member mounted in fixed relation to said coil unit and in spaced relation to said plug member to provide an armature space, said plug member and said housing block member having end faces bounding said armature space, a plunger type armature disposed in said bore in said armature space where its stroke is limited at both ends thereof, said armature having a first end face magnetically pulled against said plug when said coil unit is energized, return means opposing said energizing force of said coil unit, said armature having a second end face at the other end thereof which is pushed into engagement with said housing block member by said return means when said coil unit is de-energized, valve seat and valve seat closure means associated with at least one end of said armature and at least one of said members, a layer of refrigerant-proof plastics such as polytetrafluoroethylene forming one of said end faces of the engaging end faces between said plug member and said armature.

2. A magnetic valve according to claim 1 including a second layer of a refrigerant-proof plastic such as polytetrafluoroethylene forming one of said end faces of the engaging end faces between said armature and said housing block member.

3. A magnetic valve according to claim 2 including an armature tube in which said plug member and said housing block are fixedly secured, said housing block being connected to said yoke only through said resilient means connecting said plug member to said yoke, said resilient means being elastic layers compressible in both directions of movement of said armature.

4. A magnetic valve according to claim 1 wherein said yoke having parallel limbs with aligned openings, said plug member having at one end a screw threaded section of smaller diameter forming an annular shoulder, said threaded section extending through one of said openings, a nut engaging said threaded section, said resilient means comprising elastic rings surrounding said threaded section and being disposed on opposite sides of the associated limb between said shoulder and said nut.

5. A magnetic valve according to claim 2 characterized in that said second layer is formed by an inserted ring.

6. A magnetic valve according to claim 1 wherein said layer of plastics is formed by a coating applied to said end face of said plug member.

7. A magnetic valve according to claim 2 characterized in that said first named layer is subjected to said armature over a larger area than said second layer.

8. A magnetic valve according to claim 1 characterized in that said armature has an axially extending bore with counter bearing at opposite ends thereof, said closure means comprising valve elements at opposite ends of said axially extending bore, and spring means biasing said elements against said counterbearings.

9. A magnetic valve according to claim 1 characterized in that connecting conduit means are provided in said plug member and said housing block member.

* * * * *